(12) United States Patent
Scekic

(10) Patent No.: US 8,535,197 B2
(45) Date of Patent: Sep. 17, 2013

(54) SPEED CHANGER ASSEMBLY

(75) Inventor: Vladimir Scekic, New Westminster (CA)

(73) Assignee: Enerflex Ltd., Calgary (CA)

( * ) Notice: Subject to any disclaimer, the term of this patent is extended or adjusted under 35 U.S.C. 154(b) by 521 days.

(21) Appl. No.: 12/778,507

(22) Filed: May 12, 2010

(65) Prior Publication Data
US 2011/0281682 A1   Nov. 17, 2011

(51) Int. Cl.
*F16H 57/08* (2006.01)
(52) U.S. Cl.
USPC ............... 475/331; 475/10; 475/7; 74/413
(58) Field of Classification Search
USPC ............ 475/7, 10, 42, 331; 74/413, 412 R
See application file for complete search history.

(56) References Cited

U.S. PATENT DOCUMENTS

| | | | |
|---|---|---|---|
| 1,604,401 A | 10/1926 | Fisher | |
| 1,903,210 A | 3/1933 | Carrier | |
| 2,044,660 A * | 6/1936 | Alden | 475/314 |
| 2,548,272 A * | 4/1951 | Seybold | 475/42 |
| 2,786,366 A * | 3/1957 | Tallakson | 475/249 |
| 2,958,405 A | 11/1960 | Glamann | |
| 3,430,509 A * | 3/1969 | Couris | 74/413 |
| 3,527,121 A * | 9/1970 | Moore | 475/338 |
| 3,885,473 A | 5/1975 | Stratienko | |
| 3,974,718 A | 8/1976 | Kylberg | |
| 4,018,544 A | 4/1977 | Eberhardt | |
| 4,281,560 A | 8/1981 | Herscovici | |
| 4,346,624 A | 8/1982 | Nagasaki et al. | |
| 4,687,411 A | 8/1987 | Maeda et al. | |
| 6,508,737 B2 | 1/2003 | Fujimoto | |
| 6,537,169 B1 * | 3/2003 | Morii | 475/8 |
| 7,047,838 B2 | 5/2006 | Varela et al. | |
| 7,293,543 B1 | 11/2007 | Scekic | |
| 2002/0178851 A1 * | 12/2002 | Giuriati | 74/413 |
| 2005/0192151 A1 * | 9/2005 | Simon | 475/331 |
| 2006/0142114 A1 * | 6/2006 | Fox | 475/348 |

* cited by examiner

*Primary Examiner* — Sherry Estremsky
*Assistant Examiner* — Lillian Nguyen
(74) *Attorney, Agent, or Firm* — Bereskin & Parr LLP; Isis E. Caulder

(57) ABSTRACT

A speed changer assembly for changing the rotational speed of an engine's (or other prime mover's) output to that required by the input of a process machine. In operation, a first gear is in meshing engagement with an idler gear, which in turn, is in meshing engagement with a second gear. When operation of the speed changer assembly is halted, the idler gear is pivotable about one of the first and second gears. A center distance between the idler gear and the gear about which the idler gear is pivoted remains constant while the center distance between the idler gear and the other gear is varied. The idler gear is taken out of meshing engagement with the other gear, permitting replacement of said other gear. The idler gear is then pivoted to establish meshing engagement with the replacement gear and the speed changer is configured with a new speed ratio.

9 Claims, 12 Drawing Sheets

SECTION B-B

SECTION C-C

SPEED CHANGER ASSEMBLY

TECHNICAL FIELD

This invention relates to a mechanical power transmission device and more particularly to the method of changing the speed-ratio between the input and output shafts of speed changers.

BACKGROUND

It is common to drive a generator, compressor, pump or other process machine with a prime mover, such as an internal combustion engine. Most internal combustion engines have a speed, or range of speeds, at which they run most efficiently, which is normally measured in revolutions per minute. Also, most engines are designed and built to rotate in one direction only, typically counter-clockwise when facing the flywheel.

In many cases, the most efficient speed of the engine is different than the rotational speed required by the process machine. In other cases, it is not practical to run the engine at the speed required by the process machine. In such cases, it is beneficial to increase or decrease the speed of the engine with external gearing, rather than to adjust the running speed of the engine. It should also be noted that most process machines are designed and built to rotate in one direction only, very often in the same direction as the engine used as the prime mover (typically clockwise when facing the input shaft of the process machine).

A combination of gearing that increases or decreases the speed of an engine's output shaft may be referred to as a speed changer assembly. A speed changer assembly may be disposed externally, between the engine and the process machine, or alternatively internally, as an integrated component of either the prime mover or the process machine.

The ratio of the rotational speed of the output of the prime mover to the rotational speed of the input shaft of the process machine is referred to as the speed (or transmission) ratio of the speed changer. Most speed changers installed in industrial applications have a fixed speed ratio. Change of this ratio typically involves costly, heavy replacement components, use of specialized tools and skilled work-force. It may involve extended down-time of the equipment and is generally regarded as a very expensive option. As such, ratio change is only done when absolutely necessary, which leads to equipment frequently running inefficiently, at less than optimum conditions.

The speed ratio requirement in the speed changer is calculated based on parameters of prime mover, process machine and processed media (gas, fluid, slurry etc.). For initial installations, these calculations are often based on input data that may be unreliable such that change of speed ratio is often desirable shortly after the start-up of equipment. Also, "field conditions" often change during the lifetime of any given installation which, again, leads to the need for a change of speed ratio, which must often be done "in the field".

There is a need for a speed changer that uses single-speed gearing for maximum efficiency. Moreover, the single-speed gearing arrangement needs to be designed such that the speed ratio change can be effectuated with less difficulty and with low-cost replacement components. Effectuating the ratio-change should be practical in "field-conditions" with no or minimum requirement for special tooling, without the need for highly specialized skilled work-force. Simple, inexpensive speed ratio change of a speed changer may provide possibilities for better optimization of equipment leading to higher overall efficiencies and lower life-cycle cost of the equipment.

SUMMARY

In one broad aspect, a speed changer assembly for transmitting rotational energy from a prime mover to a process machine is provided. The speed changer assembly includes:

(a) a first gear operatively couplable to a rotational output of the prime mover;

(b) an idler gear in meshing engagement with the first gear; and, (c) a second gear in meshing engagement with the idler gear, and operatively coupled to a driven shaft of the assembly, the driven shaft operatively couplable to a rotational input of the process machine, wherein when the assembly is not in operation, the idler gear is continuously pivotable about a central axis of one of the first gear and the second gear.

In another broad aspect, another speed changer assembly for transmitting rotational energy from a prime mover to a driven shaft of the assembly is provided. The speed changer assembly includes:

(a) an internal ring gear operatively couplable to a rotational output of the prime mover;

(b) at least one primary planet gear in meshing engagement with the internal ring gear;

(c) for each of the at least one primary planet gear, a corresponding secondary planet gear in meshing engagement with the primary planet gear;

(d) a sun gear in meshing engagement with at least one secondary planet gear, the sun gear being operatively couplable to the driven shaft of the assembly; and, (e) a plurality of removable flanges, each flange having at least one primary flange bore for localizing the at least one primary planet gear, and at least one secondary flange bore for localizing the at least one corresponding secondary planet gear.

In yet another broad aspect, a method of changing the speed ratio of a speed changer assembly is provided. The method includes:

(a) providing a first gear operatively couplable to a rotational output of a prime mover;

(b) providing an idler gear in meshing engagement with the first gear;

(c) providing a second gear in meshing engagement with the idler gear, the second gear operatively coupled to a driven shaft of the assembly;

(d) pivoting the idler gear about a central axis of one of the first gear and the second gear to release the meshing engagement between the idler gear and the other of the first gear and the second gear;

(e) replacing the other of the first gear and second gear with a replacement gear differing in pitch diameter; and (f) pivoting the idler gear about a central axis of rotation of the one of the first gear and the second gear to establish meshing engagement between the idler gear and the replacement gear.

In yet another broad aspect, another method of changing the speed ratio of a speed changer assembly is described. The method includes:

(a) providing an internal ring gear operatively couplable to a rotational output of the prime mover;

(b) providing at least one primary planet gear;

(c) providing a secondary planet gear for each of the at least one primary planet gear;

(d) providing a first sun gear operatively couplable to a driven shaft of the assembly;

(e) providing a first pair of removable flanges for positioning the at least one primary planet gear and secondary planet gear, wherein the at least one primary planet gear is positioned for meshing engagement with the internal ring gear, and each secondary planet gear is positioned for meshing engagement with a primary planet gear and the sun gear;

(f) replacing the first sun gear with a second sun gear, the second sun gear having a pitch diameter different from the first sun gear;

(g) providing a second pair of removable flanges for repositioning each of the secondary planet gears; and (h) repositioning each of the secondary planet gears for meshing engagement with a primary planet gear and with the second sun gear.

Further aspects and advantages of the invention will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1:
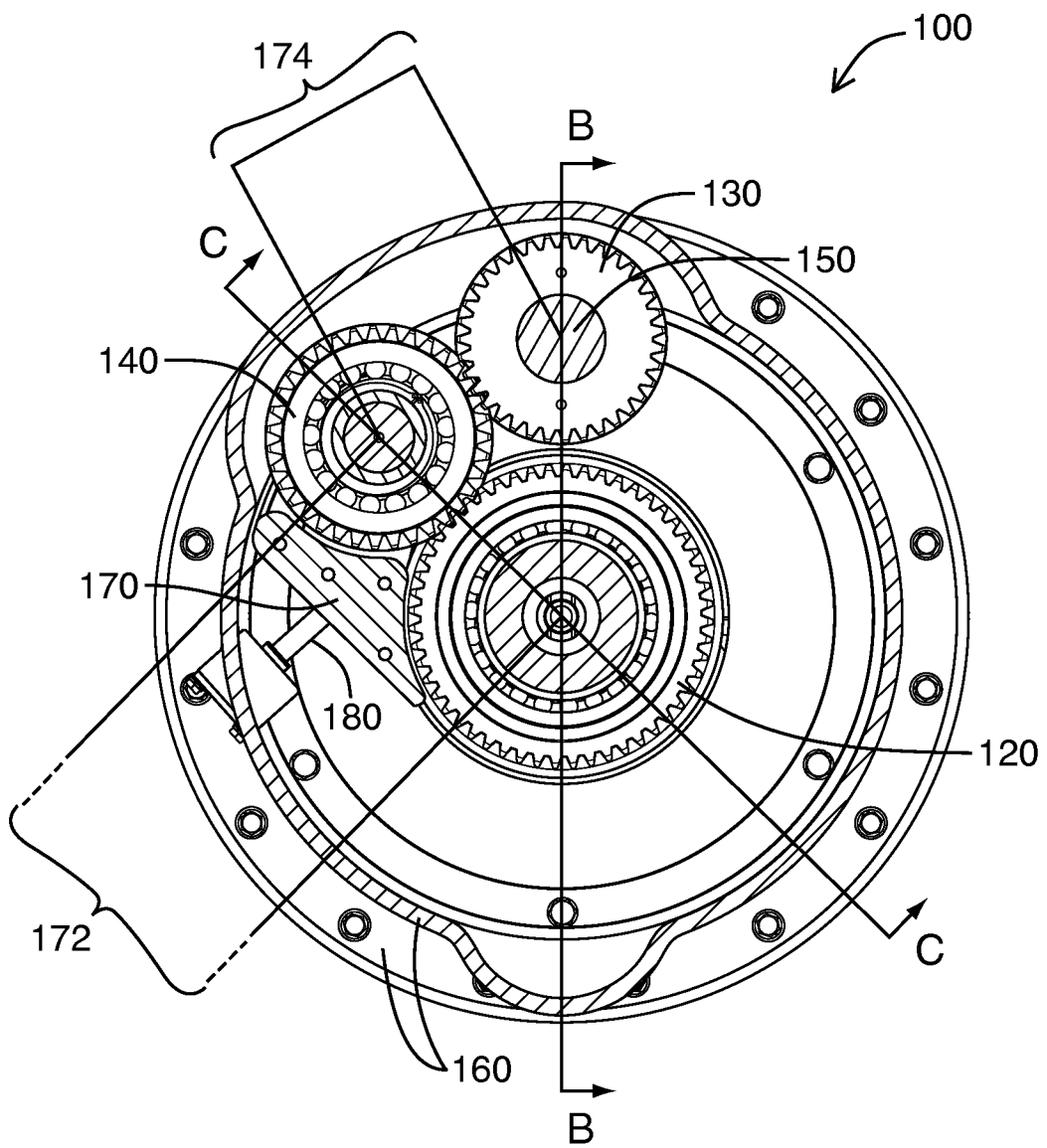
FIG. 1 is a sectional view of an exemplary speed changer assembly.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 2:
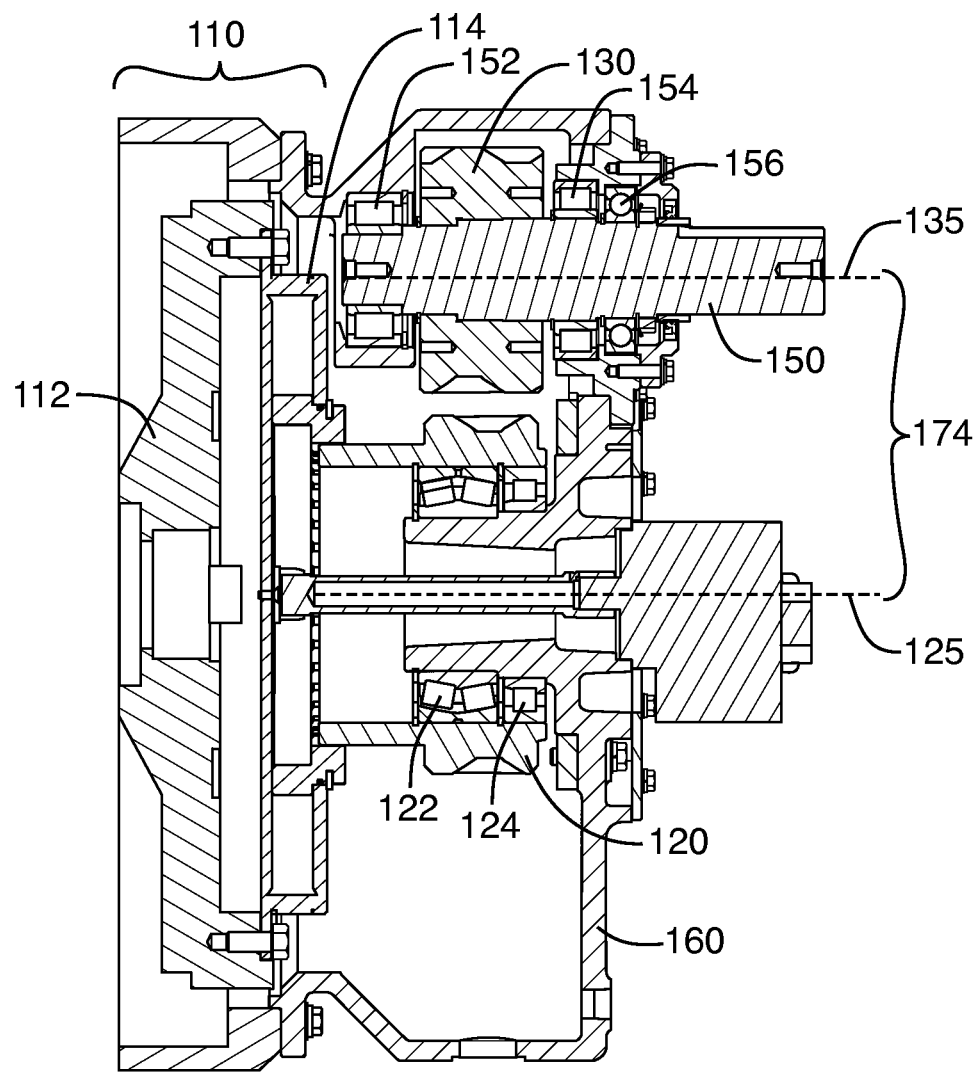
FIG. 2 is a sectional view of the speed changer assembly of FIG. 1, through section line B-B.
Figure 3:
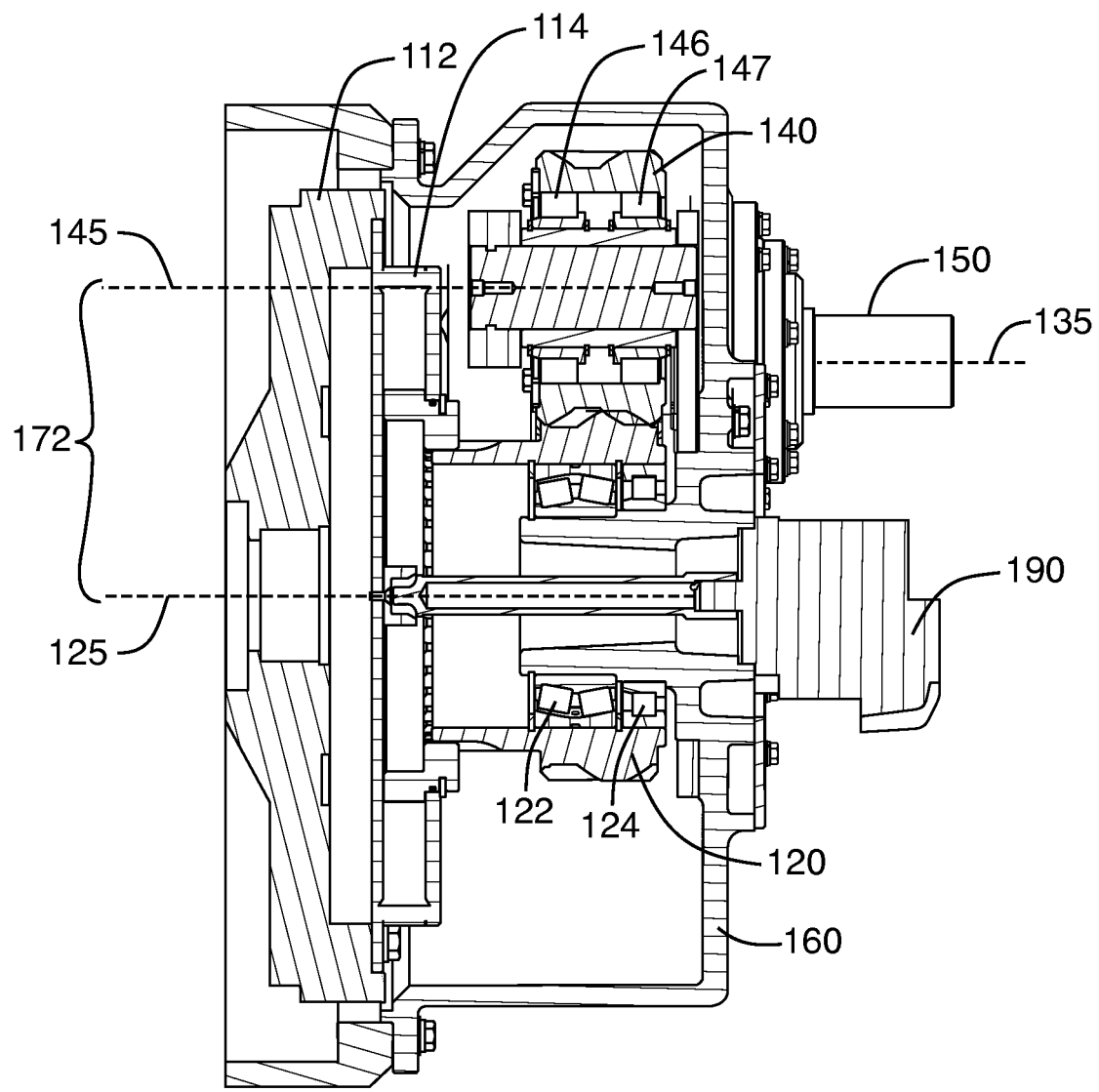
FIG. 3 is a sectional view of the speed changer assembly of FIG. 1, through section line C-C.

Reference is first made to FIGS. 1 to 3. FIG. 1 shows a sectional view of an exemplary speed changer assembly, shown generally as 100; and, FIGS. 2 and 3 show section views of the speed changer assembly 100 along section lines B-B and C-C, respectively, of FIG. 1. The speed changer assembly 100 is a power transmission device that may be used to vary the rotational speed of the output of a prime mover (not shown) to that required by the input of a process machine (not shown). A prime mover may include, but is not limited to, an engine (e.g. an internal combustion engine); and a process machine may include, for example, a compressor (e.g. a screw compressor), a generator, and a pump. It will be appreciated by those skilled in the art that the speed changer assembly 100 can be used with a variety of different types of prime movers and process machines and in other industries and applications.

The speed changer assembly 100 includes a number of rotating components including a flywheel assembly 110 (shown in FIG. 2), a first gear 120, a second gear 130, an idler gear 140, and a driven shaft 150. In order for the speed changer assembly 100 to vary the speed of the rotational output of the prime mover, the first gear 120 and the second gear 130 are provided with a different number of gear teeth. In the embodiment shown, the first gear 120 has more gear teeth than the second gear 130, thereby making the first gear 120 the low-speed gear of the speed changer assembly 100, and the second gear 130 the high-speed gear (or the pinion) of the assembly 100. As a result of the gear selection illustrated, the speed changer assembly 100 functions as a speed increaser. It will be appreciated by those skilled in the art that the speed changer assembly 100 can function as a speed decreaser by providing a second gear 130 with more gear teeth than the first gear 120.

Reference is now made to FIG. 2. As shown, the flywheel assembly 110 is attached to the first (low-speed) gear 120 as well as to the engine (not shown). Accordingly, when the engine rotates, it causes the flywheel assembly 110 to rotate. This rotational movement is directly transferred to the low-speed gear 120, causing it to rotate at the same speed and in the same direction as the engine. The flywheel assembly 110 comprises a flywheel 112, and may comprise a torsionally resilient coupling assembly 114. The flywheel 112 may be rigidly mounted to the engine crankshaft (not shown). The torsionally resilient coupling assembly 114 helps to prevent occurrence of torsional resonance in the system.

As shown in FIGS. 1 and 3, the low-speed gear 120 is meshingly engaged with the idler gear 140. The idler gear 140 is meshingly engaged with the second (high-speed) gear (or pinion) 130, which, in turn, is operatively connected to the driven shaft 150. Thus, power is transmitted, in the form of rotational energy, from the engine (not shown) to the process machine (not shown) by way of the flywheel assembly 110, the first (low-speed) gear 120, the idler gear 140, the second (high-speed) gear (or pinion) 130, and the driven shaft 150. The engine and the driven shaft 150 rotate in the same direction, but the rotational speed of the driven shaft 150 will be higher than the rotational speed of the engine (not shown); the speed ratio—also called the transmission ratio—being equal to the ratio of the number of teeth on the first (low-speed) gear 120 to the number of teeth on the second (high-speed) gear (or pinion) 130. The driven shaft 150 may be supported and located by bearings 152, 154, and 156, and the first gear 120 may be mounted on and located by bearings 122, 124, which are seated within the housing 160 of the speed changer assembly 100.

The idler gear 140 may be mounted in an idler carrier assembly 170, which in turn, may be rotatably mounted to either the first (low-speed) gear 120 or the second (high-speed) gear 130. In the embodiment shown, the idler carrier assembly 170 is mounted to the first (low-speed) gear 120 such that it may be rotated around the axis of rotation 125 of the first gear 120. When the idler carrier assembly 170 is rotated around the axis of rotation 125 of the first gear 120, meshing engagement between the gears is maintained as the former rolls around the latter, causing angular displacement of the idler gear 140 which either approaches or distances the idler gear 140 to or from the second (low-speed) gear 120, depending on the direction of rotation. Therefore, as the idler carrier assembly 170 is rotated, the centre-to-centre distance 174 between the idler gear 140 and the second (high-speed) gear (or pinion) 130 is varied while a constant centre-to-centre distance 172 between the idler gear 140 and the first (low-speed) gear 120 is maintained. It will be appreciated by those skilled in the art that the idler carrier assembly 170 may equally be rotatably mounted to the second (high-speed) gear 130, in which case a rotation of the idler carrier assembly 170 would effect a change in the centre-to-centre distance 172 between the idler gear 140 and the first (low-speed) gear 120 while maintaining a constant centre-to-centre distance 174 between the idler gear 140 and the second (high-speed) gear 130. It will also be appreciated that rotation of the idler carrier assembly 170 can only be accomplished while the speed changer assembly 100 is not in operation (i.e. when the prime mover is not running).

When changing the speed ratio of the speed changer assembly 100, only the gear to which the idler carrier assembly 170 is not mounted (the second gear 130 in the embodiment illustrated) needs to be changed. When a new second (high-speed) gear 130 with a different number of teeth is installed in the speed changer assembly 100 in order to effect a speed ratio change, the center-to-centre distance 174 between the idler gear 140 and the second gear 130 will require adjusting in order to establish meshing engagement between the idler gear 140 and the new second gear 130. As mentioned above, this can be achieved by rotating the idler carrier assembly 170 around the axis of rotation 125 of the first gear 120. Those skilled in the art will appreciate that the gear 130 coupled to the driven shaft 150 is typically the smallest, least expensive and most easily accessible gear in the speed changer assembly 100; therefore, it may be preferable to have the idler carrier assembly 170 mounted to the other gear (i.e. not the gear coupled to the driven shaft 150) in order to minimize the cost and work associated with changing the speed ratio.

Figure 4:
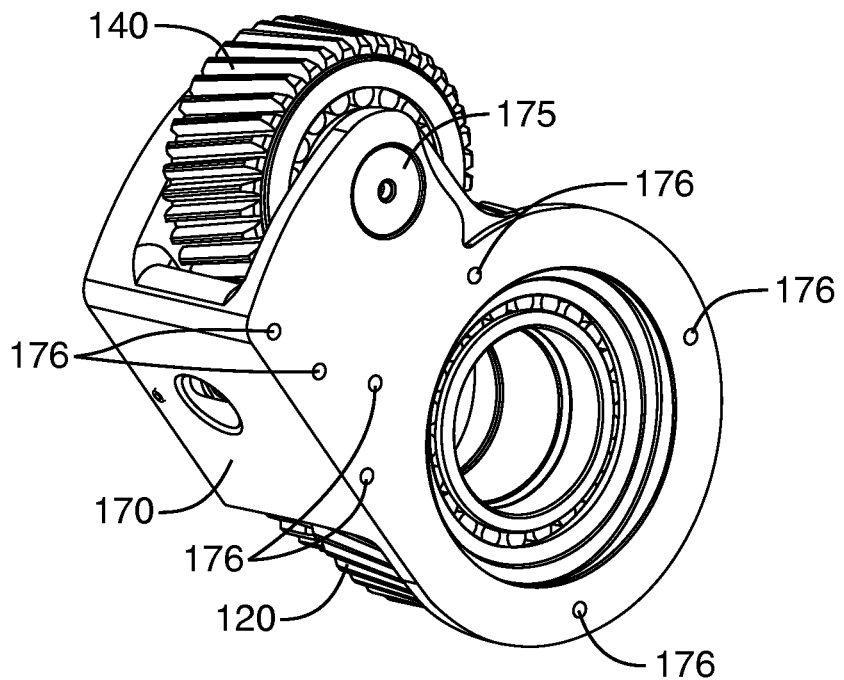
FIG. 4 is a perspective view of an example carrier assembly.

Reference is now made to FIG. 4, which shows a perspective view of an exemplary idler carrier assembly 170 mounted to a gear (the first gear 120), with the idler gear 140 mounted thereto. The idler gear 140 is mounted to the carrier assembly 170 such that it can rotate freely about an idler shaft 175. The idler gear 140 may be mounted on and located by bearings 146, 147 (best illustrated in FIG. 4) within the carrier assembly 170. The idler carrier assembly 170 may also comprise bolt holes 176 for receiving bolts threaded through the housing 160 of the speed changer assembly 100 to affix the idler carrier assembly 170 within the housing 160 during operation of the speed changer assembly 100.

Figure 5:
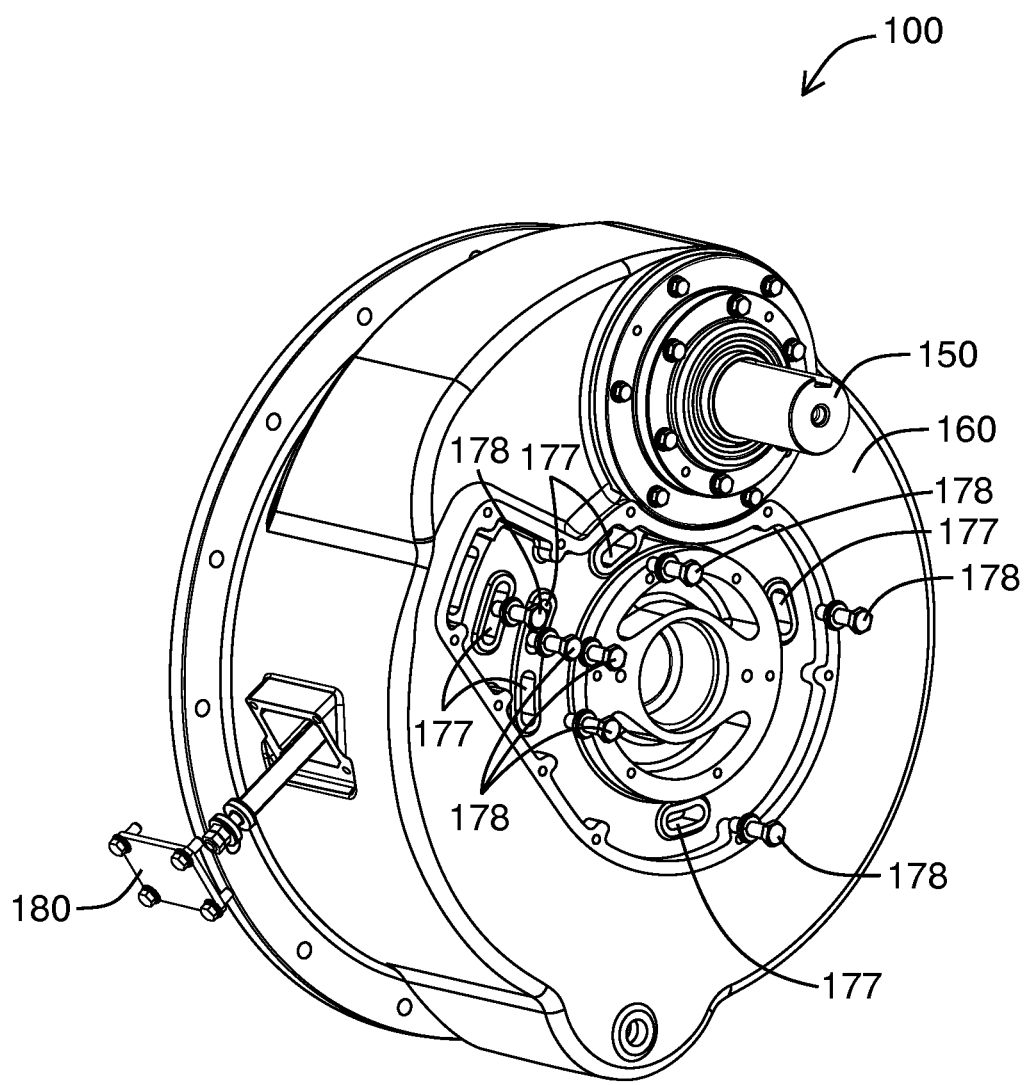
FIG. 5 is a perspective view of the speed changer assembly of FIG. 1.

Reference is now made to FIG. 5, which shows a perspective view of the speed changer assembly 100 to illustrate how the idler carrier assembly 170 (not visible) may be affixed within the housing 160, and rotated, from outside the housing 160 (thereby obviating taking apart the housing 160 of the speed changer assembly 100 entirely when effecting a speed ratio change).

During operation of the speed changer assembly 100, the idler carrier assembly 170 is securely positioned within the housing 160. The carrier assembly 170 may be positioned using bolts 178 threaded through the housing 160 of the speed changer assembly 100 and received in corresponding bolt holes 176 (FIG. 4) in the carrier assembly 170. The housing 160 of the speed changer assembly 100 may comprise one or more arcuate slots 177 to allow each bolt 178 to penetrate the housing 160. The arcuate slots 177 are aligned substantially with the range of motion of each bolt hole 176 in the carrier assembly 170.

A rod 180 may be coupled to the idler carrier assembly 170. The rod 180 may be telescopic and biased toward an extended position (the rod is illustrated in the extended position in FIG. 5). When the speed changer assembly 100 is in operation, the rod 180 may be bolted to the housing 160 in a retracted position (as shown in FIG. 1).

As mentioned above, in order to rotate the idler carrier assembly 170, the speed changer assembly 100 must not be in operation. Rotation of the carrier assembly 170 may be effected by first decoupling the rod 180 from the housing 160 of the speed changer assembly 100. As mentioned above, the rod 180 may bias toward an extended state and therefor be caused to protrude from the housing 160 of the speed changer assembly 100 as a result. The bolts 178 of the carrier assembly 170 are then loosened to allow rotation of the carrier assembly 170 by either pulling or pushing on the rod 180. In an alternative embodiment, a spring force may bias the idler carrier assembly 170 toward the gear around which it is not pivotable (e.g. the second gear 130 in the embodiment of FIG. 1).

Once the idler carrier assembly 170 is repositioned in the desired position (at which point the idler gear 140 will be in meshing engagement with both the first 120 and second 130 gears), the carrier assembly 170 is securely positioned within the housing 160 of the speed changer assembly 100 by tightening the bolts 178 to an appropriate level of torque. Once the carrier assembly 170 is localized with the speed changer assembly 100 (i.e. locked in place), the rod 180 may be forced back into the retracted position and fastened to the housing 160. An end cap 190 (FIGS. 2 and 3) may be attached to the housing 160 of the speed changer assembly 100 to cover the discontinuities in the housing 160 (e.g. the arcuate slots 177) that allow localization of the carrier assembly 170.

Those skilled in the art will appreciate that the appropriate center distance can be easily determined by a number of means such as, but not limited to, predetermined, ratio-specific dowel-pin connections between the idler carrier assembly 170 and the housing of the speed changer assembly 100, or by measuring the backlash between the teeth of idler gear 140 and the high-speed gear 130.

Figure 6:
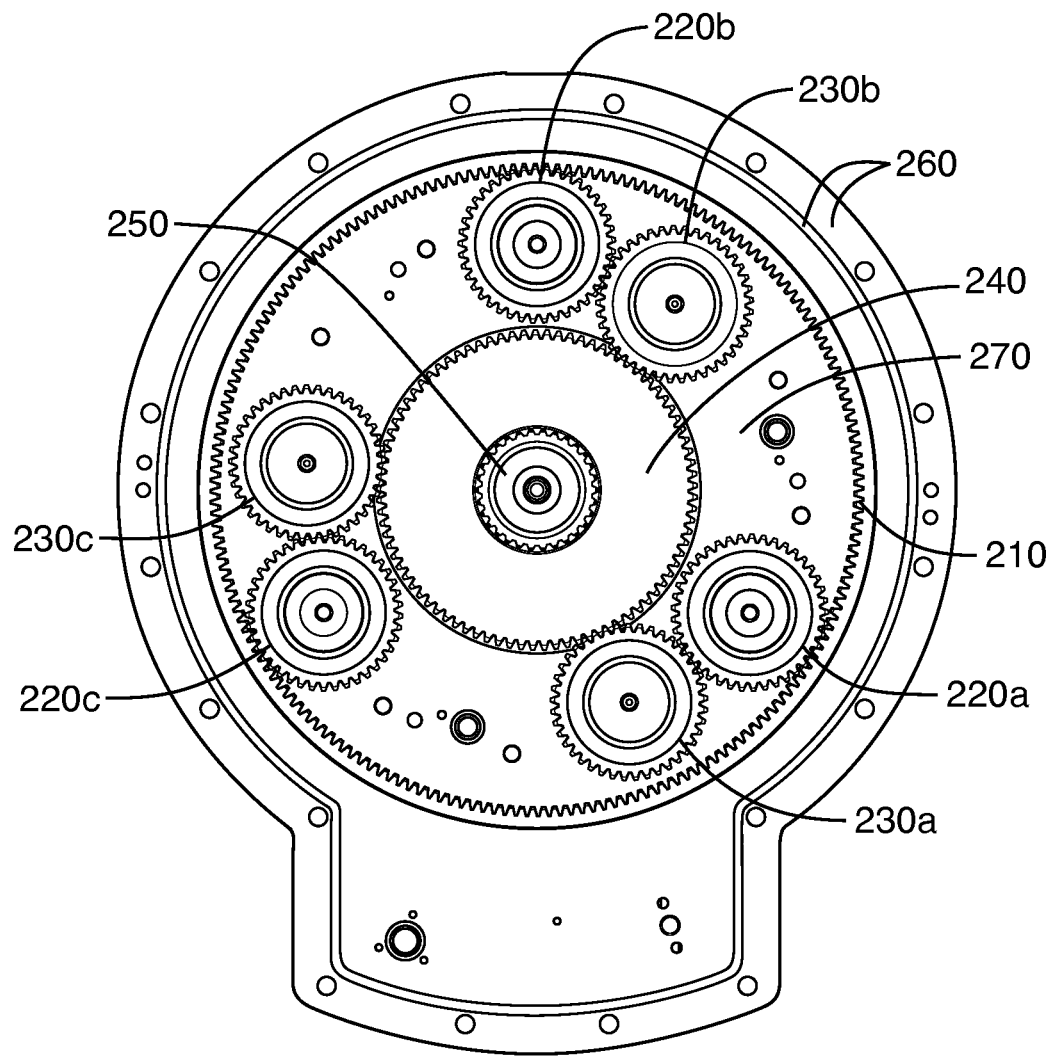
FIG. 6 is a section view of another exemplary speed changer assembly.

Reference is now made to FIG. 6, which shows a sectional view of another exemplary speed changer assembly, shown generally as 200. The speed changer assembly 200 comprises a number of rotating components including an internal ring gear 210, at least one primary planet gear 220, at least one secondary planet gear 230, a sun gear 240 (or sun pinion), and a driven shaft 250. The number of primary planet gears 240 will be the same as the number of secondary planet gears 230 in the speed changer assembly 200. The internal ring gear 210 may be coupled to the flywheel assembly (not shown) of a prime mover (not shown). Accordingly, the rotational output of the prime mover (not shown) is transferred to the internal ring gear 210, causing it to rotate at the same speed and in the same direction as the engine.

As shown in FIG. 6, the internal ring gear 210 is meshingly engaged with the primary planet gears 220a, 220b, and 220c (referred to interchangeably as 220). In turn, the primary planet gears 220 are meshingly engaged with the secondary planet gears 230a, 230b, and 230c (referred to interchangeably as 230). Further, the secondary planet gears 230 are meshingly engaged with the sun-pinion 240, which, in turn, is operatively coupled to the driven shaft 250 (e.g. by providing complementary splined configurations to the driven shaft 250 and the inside of the sun gear 240). Thus, power is transmitted, in the form of rotational energy, from the engine (not shown) to the process machine (not shown) by way of the flywheel assembly (not shown), the internal ring-gear 210, the primary planet gears 220, the secondary planet gears 230, the sun gear 240, and the driven shaft 250. In the embodiment shown, the engine (not shown) and the driven shaft 250 rotate in the same direction, but the rotational speed of the driven shaft 250 will be higher than the rotational speed of the engine (not shown), the speed ratio being equal to the ratio of the number of teeth on the internal ring gear 210 to the number of teeth on the sun gear 240.

Figure 7:
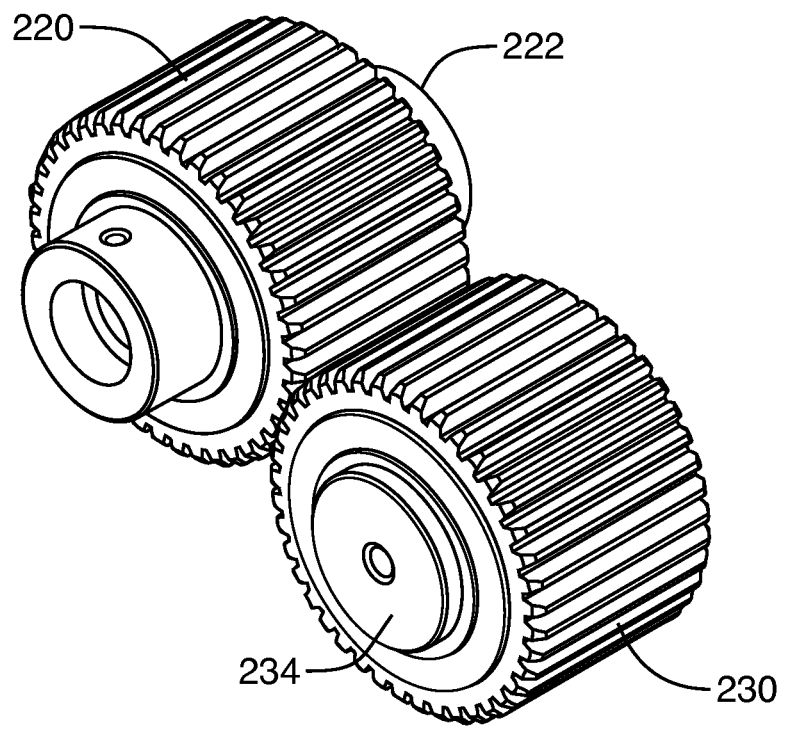
FIG. 7 is a perspective view of an exemplary primary planet gear in meshing engagement with an exemplary secondary planet gear, in isolation.
Figure 8B:
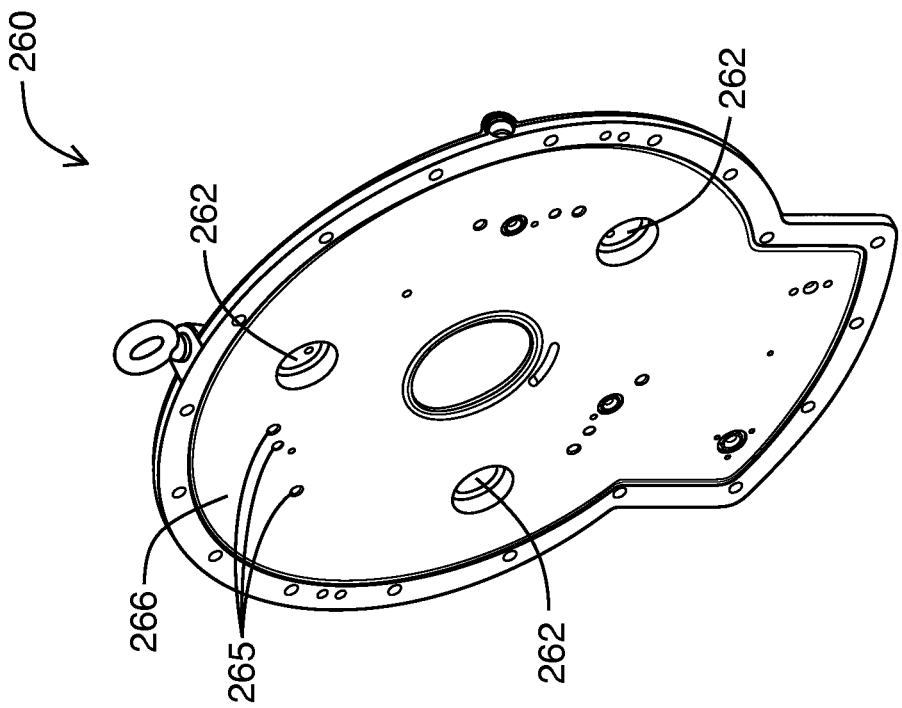
FIG. 8B is a perspective view of a portion of an exemplary housing for the speed changer assembly of FIG. 6.
Figure 8A:
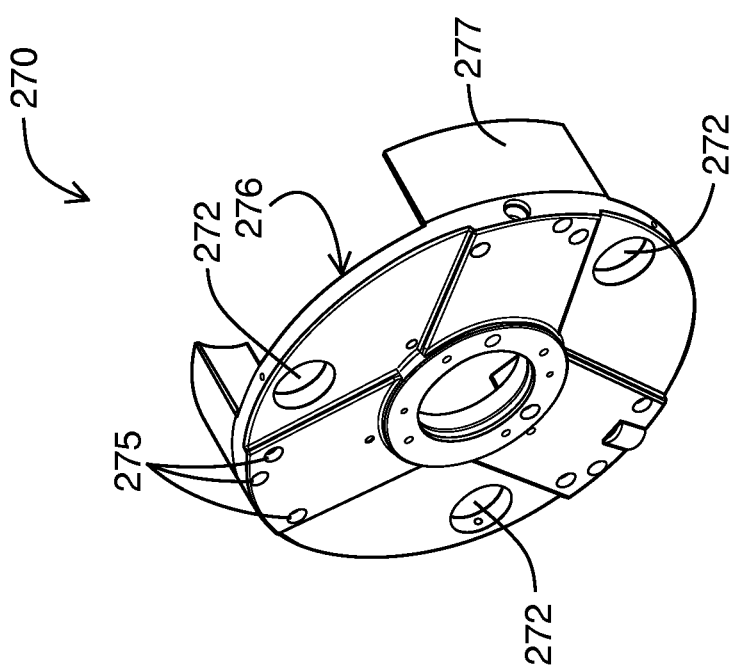
FIG. 8A is a perspective view of an exemplary carrier member, in isolation.

Reference is now made jointed to FIGS. 6, 7, 8A, and 8B of which FIG. 7 illustrates, in perspective, an exemplary primary planet gear 220 in meshing engagement with an exemplary secondary planet gear 230; and, FIGS. 8A and 8B illustrate, in isolation, a perspective view of an exemplary carrier member 270 with carrier bores 272, and an exemplary portion of a housing 260 with housing bores 262, respectively. The primary planet gear 220 may be mounted on a primary planet pin 222 that may be used to localize the primary planet gear 220 within the speed changer assembly 200. Each primary planet gear 220 may be localized by sandwiching the gear between the housing 260 and a carrier member 270 such that the portions of the primary planet pin 222 protruding from either side of the primary planet gear 220 are slotted through a carrier bore 272 and corresponding housing bore 262. As will be explained in more detail below, the location of the primary planet gears 222 is independent of the speed ratio of the speed changer assembly 200. Therefore the location of the housing bores 262 and the carrier bores 272 may remain constant. In other words, the position of the housing bores 262 and the position of the carrier bores 272 do not require adjustment in order to change the speed ratio of speed changer assembly 200 (which could, in turn require replacement of the entire housing 260).

Figure 9:
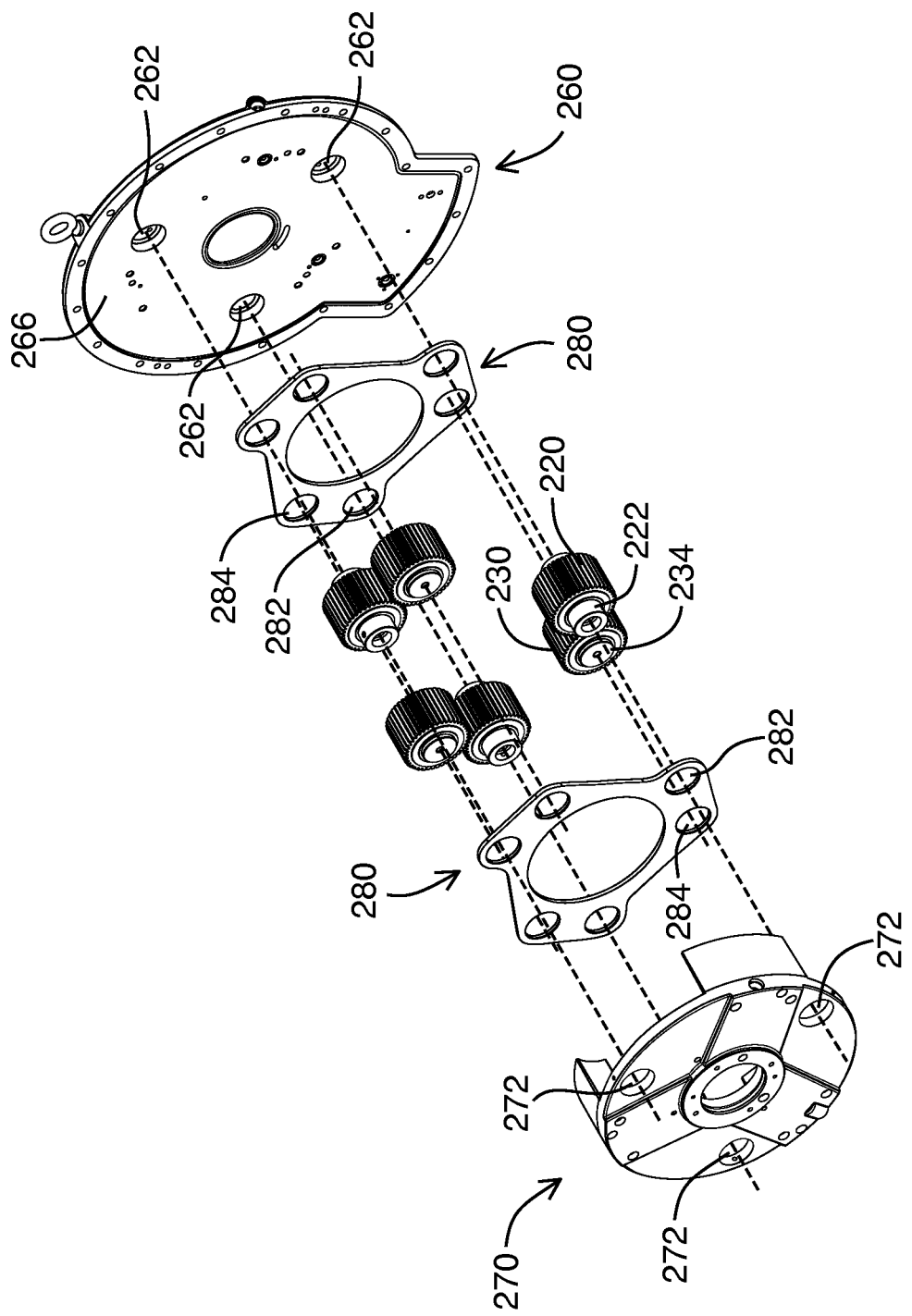
FIG. 9 is an exploded view of some of the components of the speed changer assembly of FIG. 6.

Additional reference is now made to FIG. 9, which illustrates the relationship between the primary 220 and secondary 230 planet gears, an exemplary pair of removable flanges 280, and an exemplary carrier member 270 and portion of housing 260 with housing bores 262. Similarly to the primary planet gears 220, each secondary planet gear 230 may be mounted on a secondary planet pin 234 that may be used to localize the secondary planet gear 230 within the speed changer assembly 200. Each secondary planet gear 230 may be localized by sandwiching the gear between a pair of removable flanges 280 provided with one or more secondary flange bores 284 (one for each secondary planet gear used in the speed changer assembly 100) for receiving the portions of the secondary planet pin 234 protruding from either side of the secondary planet gear 230. Each removable flange 280 may also be provided with one or more primary flange bores 282 (one primary flange bore 282 for each primary planet gear 220 used in the speed changer assembly 200).

During operation, one removable flange 280 is sandwiched between the housing 260 and the primary 220 and secondary 230 planet gears, having its primary flange bores 282 lined up with the housing bores 262. The second removable flange 280 is sandwiched between the carrier member 270 and the primary 220 and secondary 230 planet gears, having its primary flange bores 282 lined up with the carrier bores 272. When assembled, the removable flanges 280 are located by the primary pins 222 of the primary planet gears 230, which are slotted through the primary flange bores 282 (and seated in the housing and carrier bores 262, 272). Accordingly, the primary pins 222 will be longer than the secondary pins 234 in order to account for both threading through the removable flanges 280, and seating within the housing and carrier bores 262, 272.

Specific reference is now made to FIGS. 8A and 8B. Carrier member 270 may be coupled to the housing 260 by threading bolts (not shown) through bolt holes 275 in the carrier member 270 and fastening them to bolt holes 265 in the housing 260. When the carrier member 270 is coupled to the housing 260, there should be enough space between the inside wall 266 of the housing 260 and the inside wall 276 of the carrier member 270 to accommodate the width of the thickest of the gears between the primary planet gears 220, the secondary planet gears 230, and the sun gear 240 (which may all be the same thickness). To ensure the appropriate spacing, the carrier member 270 may comprise one or more spacer elements 277. It will be appreciated that the spacer elements 277 need not be integral with the carrier member 270. Spacer elements 277 may, alternatively, be integral with other components of the speed changer assembly 200, or, in some embodiments, may be independent components releasably attachable to other components of the speed changer assembly 200.

Figure 10A:
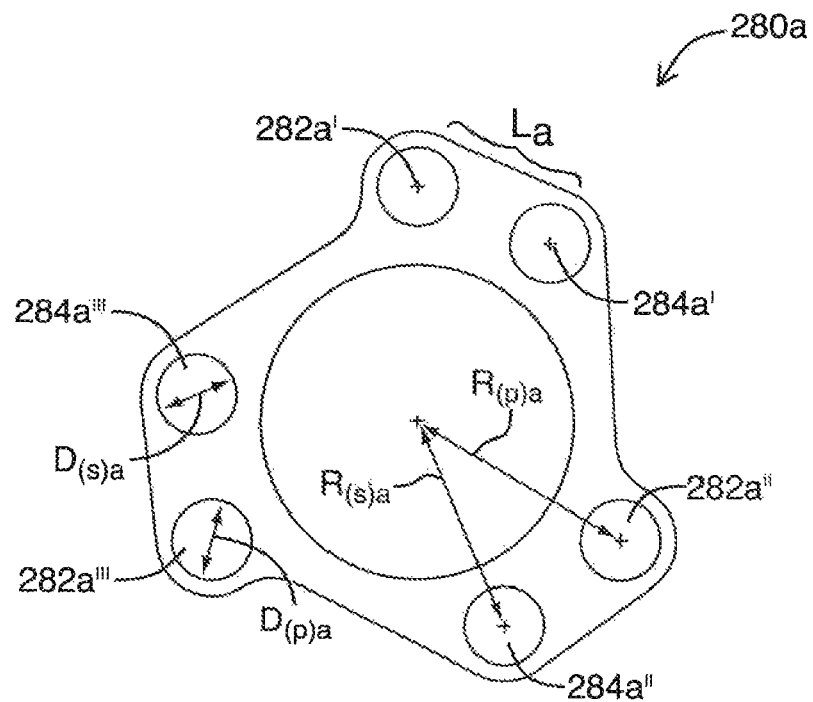
FIG. 10A is a front view of a first exemplary replacement flange for use in the speed changer assembly of FIG. 6.
Figure 10B:
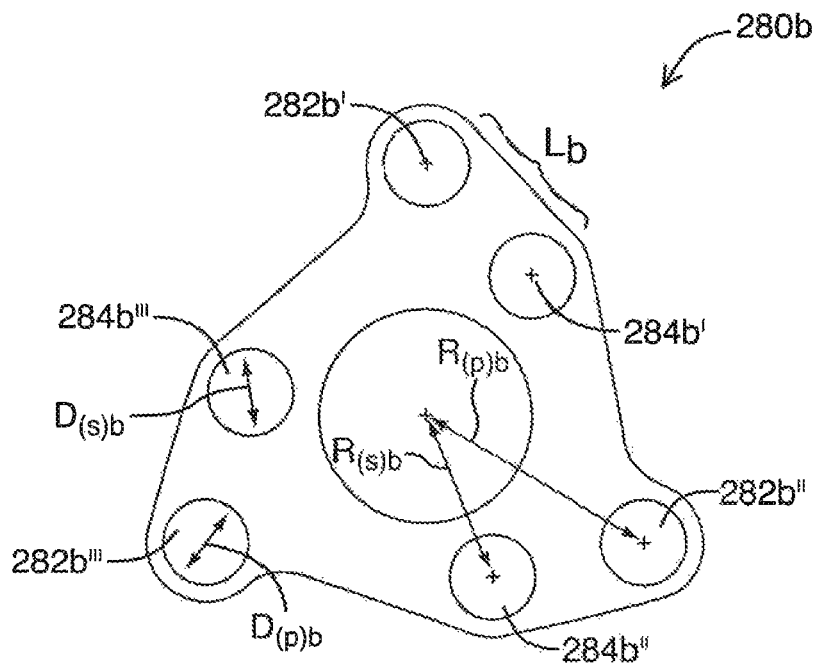
FIG. 10B is a front view of a second exemplary replacement flange for use in the speed changer assembly of FIG. 6.

Reference is now made to FIGS. 6, 10A, and 10B, of which FIGS. 10A and 10B illustrate two exemplary removable flanges 280a, 280b. Each removable flange 280a, 280b is speed-ratio specific (i.e. removable flange 280a is used to achieve a first speed ratio, and removable flange 280b is used to achieve a second (different) speed ratio). In the embodiments illustrated, the flanges 280a, 280b have three primary flange bores 282a', 282a", and 282a'" and 282b', 282b", and 282b'" respectively, and three corresponding secondary flange bores 284a', 284a", and 284a" and 284b', 284b", and 284b'", respectively (corresponding elements are indicated with the same number of 'prime' symbols following the reference numerals).

Each flange may vary slightly in shape, however, certain parameters are common to each flange in order to allow a speed ratio change to be effected to the speed changer assembly 200 by replacing only the removable flange 280 and the sun gear 240.

For example, and as mentioned above, the location of the primary flange bores 282a, 282b, is the same on each flange 280a, 280b. In other words, if flange 280a were superimposed over flange 280b, the primary flange bores 282a would align with primary flange bores 282b, and the centre-to-centre distance $R(p)_a$, $R(p)_b$ between the primary planet gears 282 and the internal ring gear 210 would be equal—the same holding true for any other speed ratio-specific removable flange. Accordingly, the housing bores 262 and carrier bores 272, whose position is fixed, may be used no matter the speed ratio for which the speed changer assembly 200 is configured.

Other examples of fixed parameters of the removable flanges 280a, 280b are the diameter $D(p)_a$, $D(p)_b$ of the primary flange bores 282a, 282b and the diameter D(s)$_a$, D(s)$_b$ of the secondary flange bores 284a, 284b. Consequently, no change in the size of the primary and secondary pins 222, 234 (FIG. 7) is required when changing the speed ratio (by using a different removable flange 280).

Yet another example of a constant parameter of each removable flange 280a, 280b is the centre-to-centre distance (e.g. L$_a$, L$_b$) between each primary flange bore (e.g. 282a', 282b') and its corresponding secondary flange bore (e.g. 284a', 284b'). Accordingly, when the removable flange 280 and sun gear 240 are replaced in order to effect a change in speed ratio, the secondary planet gears 230 are essentially pivoted about the centre of rotation of their corresponding primary planet gear 220 (similar to the idler gear 140 in the embodiment of FIG. 1); the centre-to-centre distance (e.g. L$_a$, L$_b$) between the primary planet gears 220 (and therefore the primary flange bores, e.g. 282a', 282b') and their corresponding secondary planet gears 230 (and therefore the secondary flange bores, e.g. 284a', 284b') remains constant, while the centre-to-centre distance (e.g. R(s)$_a$, R(s)$_b$) between the secondary planet gears 230 (and secondary flange bores, e.g. 284a', 284b') and the sun gear 240 varies (note that the sun gear 240 is concentric with the removable flanges 280 when the speed changer assembly 200 is assembled). This permits the same primary planet gears 220 and secondary planet gears 230 to be used despite the required modification to the to the size of the sun gear 240.

As described above, the speed ratio of the speed changer assembly 200 may be changed by replacing the sun gear 240 and the pair of removable flanges 280. Although this requires partial disassembly of the speed changer assembly 200, it can be accomplished within a fraction of time, and at a fraction of cost, as compared to traditional epicyclical speed changer systems.

Figure 11:
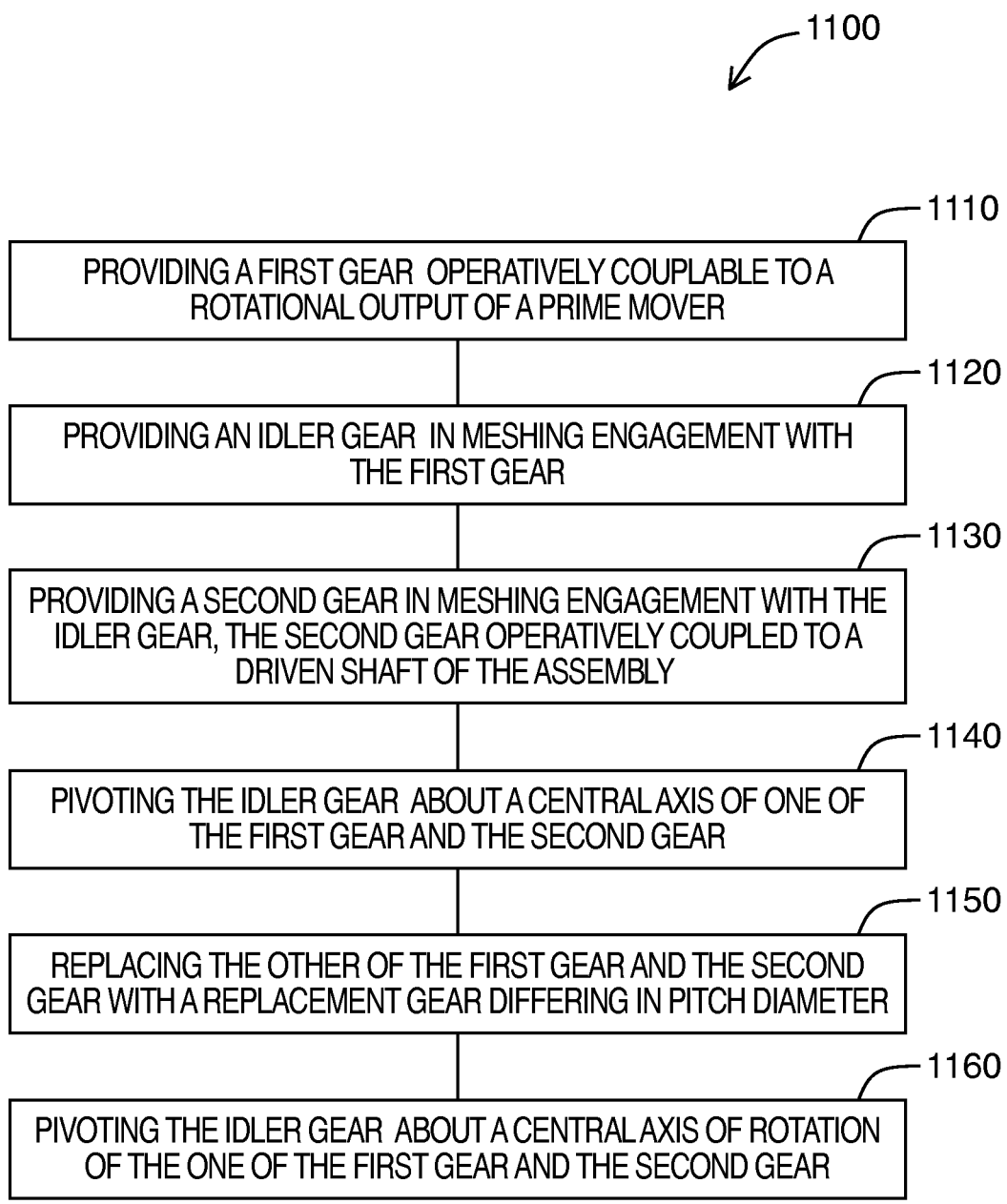
FIG. 11 is a logical flow diagram illustrating the steps of a method for changing the speed ratio of a speed changer assembly.

Referring now to FIGS. 1 and 11, a method for changing the speed ratio of the speed changer assembly 100 (referred to generally as 1100) is described. At (1110), a first (low-speed) gear 120 operatively couplable to a rotational output of a prime mover is provided. The prime mover may be an engine (e.g. an internal combustion engine), and the rotational output of the prime mover may be a flywheel.

At (1120), an idler gear 140 is provided in meshing engagement with the first (low-speed) gear 120. At (1130) a second gear 130 is provided in meshing engagement with the idler gear 140. The second gear 130 is operatively coupled to a driven shaft 150 of the speed changer assembly 100. The second gear 130 may be an integral component of the driven shaft 150 or alternatively may be releasably coupled to the driven shaft 150 (e.g. by providing the driven shaft 150 and the inner diameter of the second gear 130 with complementary splined configurations).

At (1140), the idler gear 140 is pivoted about a central axis of either the first (low-speed) gear 120 or the second (high-speed) gear 130 in order to release the meshing engagement between the idler gear 140 and the other of the first (low-speed) gear 120 and the second gear 130.

At (1150), the other of the first (low-speed) gear 120 and the second gear 130 (the one with which the idler gear 140 is no longer in meshing engagement) is replaced with a replacement gear differing in pitch diameter. At (1160), the idler gear 140 is pivoted about the central axis of the gear about which it was pivoted at (1140) (this time, in an opposite direction) in order to establish meshing engagement between the idler gear 140 and the replacement gear.

With the power transmission path between the rotational output of the process machine and the driven shaft 150 established, the speed changer assembly 100 is configured to operate at a new speed ratio.

Figure 12:
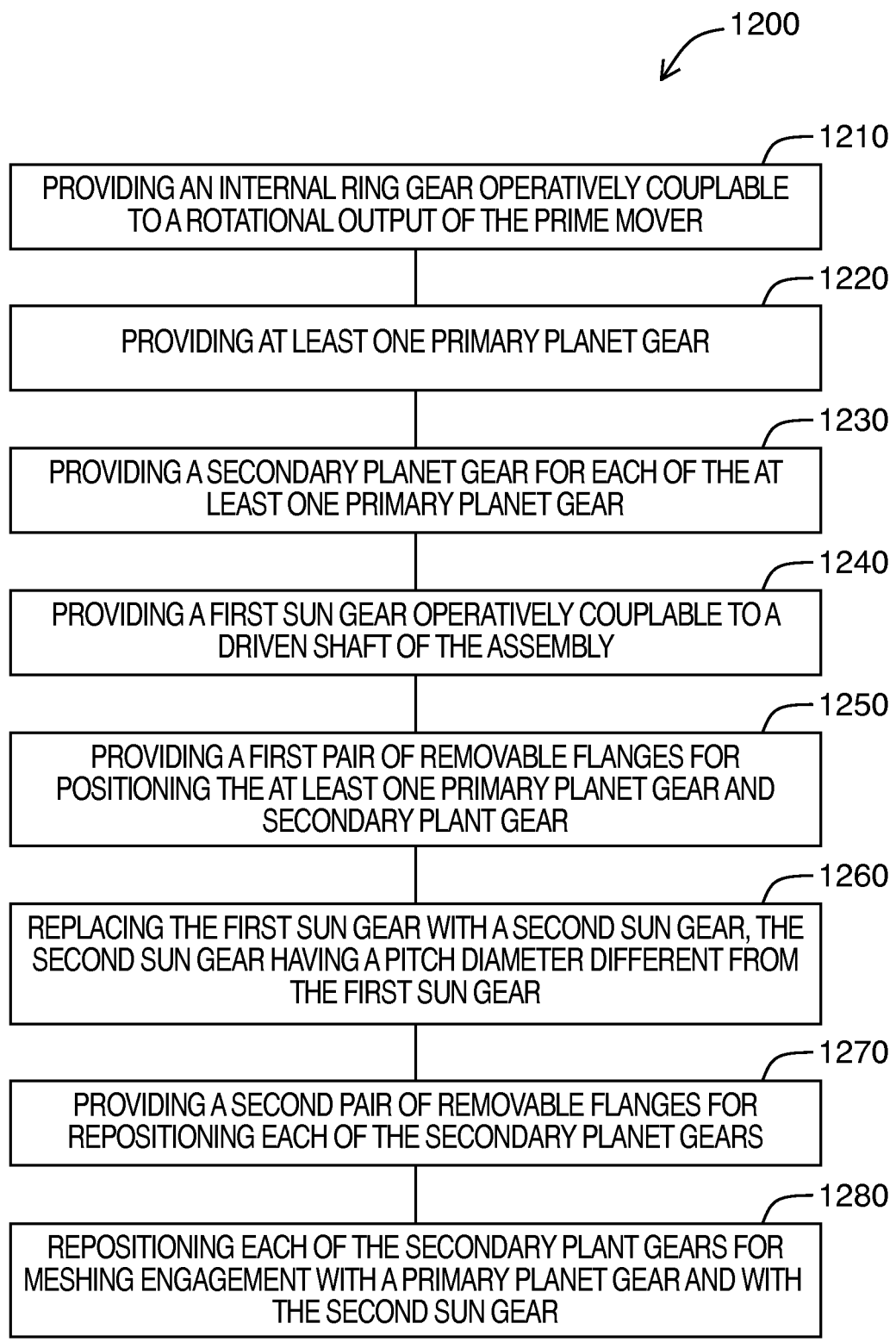
FIG. 12 is a logical flow diagram illustrating the steps of a method for changing the speed ratio of a speed changer assembly according to another embodiment.

Referring now to FIGS. 6, 9, and 12, a method for changing the speed ratio of the speed changer assembly 200 (referred to generally as 1200) is described. At (1210), an internal ring gear 210 operatively couplable to a rotational output of a prime mover is provided. The prime mover may be an engine (e.g. an internal combustion engine) and the rotational output of the prime mover may be a flywheel of the engine.

At (1220) and (1230), at least one primary planet gear 220 and, for each primary planet gear 220, a secondary planet gear 230 are provided, respectively. At (1240), a first sun gear 240 operatively couplable to a driven shaft 250 of the assembly is provided. The first sun gear 240 produces a first speed ratio of the speed changer assembly 200. The driven shaft 250 may comprise a splined shaft for mating with a complementary splined configuration on the inside of the first sun gear 240.

At (1250), a first pair of removable flanges 280 is provided for localizing the at least one primary planet gear 220 and secondary planet gear 230 such that the at least one primary planet gear 220 is positioned for meshing engagement with the internal ring gear 210, and each secondary planet gear 230 is positioned for meshing engagement with a primary planet gear 220 and the sun gear 240.

At (1260), the first sun gear 240 is replaced with a second sun gear with a different pitch diameter than (or a different number of gear teeth) than the first. The second sun gear, being a different size, necessitates repositioning of the secondary planet gears 230 in order to establish meshing engagement between the secondary planet gears 230 and the sun gear 240. At (1270), a second pair of removable flanges is provided for repositioning each of the secondary planet gears 230. Each flange provided (either at (1250) or (1270)) may comprise at least one primary flange bore for positioning the at least one primary planet gear 220, and at least one secondary flange bore 284 for positioning the at least one secondary planet gear 230.

At (1280), each of the secondary planet gears 230 is repositioned for meshing engagement with a primary planet gear 220 and with the sun gear 240. Once this step is complete, and the power transmission path between the internal ring gear 210 and the driven shaft 250 is once again established, the speed changer assembly 200 is prepared for operation at a second speed ratio, different from the first.

While certain features of the exemplary embodiments described have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. Furthermore, this description is not to be considered as limiting the scope of these embodiments in any way, but rather as merely describing the implementation of these various embodiments.

The invention claimed is:

1. A speed changer assembly for transmitting rotational energy from prime mover to a driven shaft of the assembly, the assembly comprising:
   (a) an internal ring gear operatively couplable to a rotational output of the prime mover;
   (b) at least one primary planet gear in meshing engagement with the internal ring gear;
   (c) for each of the at least one primary planet gear, a corresponding secondary planet gear in meshing engagement with the primary planet gear;

(d) a sun gear in meshing engagement with at least one secondary planet gear, the sun gear being operatively couplable to the driven shaft of the assembly; and, (e) a plurality of removable flanges, each flange having at least one primary flange bore for localizing the at least one primary planet gear, and at least one secondary flange bore for localizing the at least one corresponding secondary planet gear.

2. The assembly of claim 1, further comprising a carrier member couplable to an inside wall of a housing to substantially enclose the at least one primary planet gear, the at least one secondary planet gear, the sun gear, and the plurality of removable flanges, and wherein the housing comprises a plurality of housing bores and the carrier member comprises a plurality of carrier bores, the plurality of housing bores and the plurality of carrier bores for localizing the at least one primary planet gear.

3. The assembly of claim 1, wherein a centre-to-centre distance between the at least one primary flange bore and the at least one secondary flange bore is common to each of the plurality of flanges.

4. The assembly of claim 1, wherein a diameter of the at least one primary flange bore is common to each of the plurality of flanges, and wherein a diameter of the at least one secondary flange bore is common to each of the plurality of flanges.

5. The assembly of claim 1, wherein the at least one primary planet gear and secondary planet gear are idler gears.

6. The assembly of claim 1, wherein the at least one primary planet gear and secondary planet gear comprise outwardly protruding pins for mating with the bores of the removable flanges.

7. The assembly of claim 6, wherein the outwardly protruding pin of the at least one primary planet gear is longer than the outwardly protruding pin of the at least one secondary planet gear.

8. A method of changing the speed ratio of a speed changer assembly, the method comprising:

(a) providing an internal ring gear operatively couplable to a rotational output of a prime mover;

(b) providing at least one primary planet gear;

(c) for each of the at least one primary planet gear, providing a secondary planet gear;

(d) providing a first sun gear operatively couplable to a driven shaft of the assembly;

(e) providing a first pair of removable flanges for positioning the at least one primary planet gear and secondary planet gear, wherein the at least one primary planet gear is positioned for meshing engagement with the internal ring gear, and each secondary planet gear is positioned for meshing engagement with a primary planet gear and with the sun gear;

(f) replacing the first sun gear with a second sun gear, the second sun gear having a pitch diameter different from the first sun gear;

(g) providing a second pair of removable flanges for repositioning each of the secondary planet gears; and (h) repositioning each of the secondary planet gears for meshing engagement with a primary planet gear and with the second sun gear.

9. The method of claim 8, wherein each removable flange comprises at least one primary flange bore for positioning the at least one primary planet gear, and at least one secondary flange bore for positioning the at least one secondary planet gear.

\* \* \* \* \*